United States Patent
Zhao

(10) Patent No.: US 10,549,952 B2
(45) Date of Patent: Feb. 4, 2020

(54) SELF-EXTINGUISHING FABRIC BELT FOR ELEVATOR SYSTEM

(71) Applicant: Otis Elevator Company, Farmington, CT (US)

(72) Inventor: Chen Qian Zhao, Newark, DE (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 123 days.

(21) Appl. No.: 15/686,538

(22) Filed: Aug. 25, 2017

(65) Prior Publication Data
US 2019/0062115 A1    Feb. 28, 2019

(51) Int. Cl.
| | |
|---|---|
| *B66B 7/06* | (2006.01) |
| *B66B 9/00* | (2006.01) |
| *F16G 1/06* | (2006.01) |
| *D07B 5/00* | (2006.01) |
| *D07B 5/04* | (2006.01) |

(52) U.S. Cl.
CPC ............. *B66B 7/062* (2013.01); *B66B 9/00* (2013.01); *D07B 5/005* (2013.01); *D07B 5/04* (2013.01); *F16G 1/06* (2013.01); *D07B 2501/2007* (2013.01); *D10B 2321/021* (2013.01)

(58) Field of Classification Search
CPC ........... B66B 7/062; B66B 9/00; D07B 5/005; D07B 5/04; D07B 2501/2007; F16G 1/06; D10B 2321/021
See application file for complete search history.

(56) References Cited

U.S. PATENT DOCUMENTS

| | | | | |
|---|---|---|---|---|
| 4,879,168 A | * | 11/1989 | McCullough, Jr. .. | D04H 1/4242 442/354 |
| 5,837,760 A | * | 11/1998 | Hackl ............... | C08K 5/34928 524/127 |

(Continued)

FOREIGN PATENT DOCUMENTS

| | | |
|---|---|---|
| CN | 203700838 U | 7/2014 |
| CN | 106087445 A | 11/2016 |

(Continued)

OTHER PUBLICATIONS

European Search Report Issued in EP Application No. 18190551.4, dated Jan. 7, 2019, 8 Pages.

(Continued)

*Primary Examiner* — Michael A Riegelman
(74) *Attorney, Agent, or Firm* — Cantor Colburn LLP

(57) ABSTRACT

A belt for suspending and/or driving an elevator car including a plurality of tension elements extending longitudinally along a length of the belt, and a plurality of yarns interlaced with the plurality of tension elements forming a composite belt structure. The plurality of yarns are formed from a self-extinguishing fluoroelastomer material. An elevator system includes a hoistway, an elevator car positioned in the hoistway and movable therein, a belt operably connected to the elevator car to suspend and/or drive the elevator car along the hoistway. The belt includes a plurality of tension elements extending longitudinally along a length of the belt and a plurality of yarns interlaced with the plurality of tension elements forming a composite belt structure. The plurality of yarns are formed from a self-extinguishing fluoroelastomer material.

20 Claims, 3 Drawing Sheets

(56) References Cited

U.S. PATENT DOCUMENTS

| | | | | |
|---|---|---|---|---|
| 5,881,843 A * | 3/1999 | O'Donnell | | B66B 7/06 187/254 |
| 6,074,716 A * | 6/2000 | Tsotsis | | D02G 3/40 428/293.1 |
| 6,441,128 B1 * | 8/2002 | Bauman | | C08J 7/126 528/480 |
| 7,381,668 B2 * | 6/2008 | Carter | | B32B 5/26 442/408 |
| 7,638,446 B2 * | 12/2009 | Hartgrove | | B32B 5/26 442/408 |
| 7,823,496 B2 * | 11/2010 | Bosman | | D04C 1/12 87/9 |
| 8,056,707 B2 * | 11/2011 | Ishibuchi | | B32B 5/28 198/844.1 |
| 8,479,887 B2 * | 7/2013 | Yu | | B66B 7/062 187/251 |
| 2004/0242107 A1 * | 12/2004 | Collins | | A47C 31/001 442/403 |
| 2005/0260912 A1 * | 11/2005 | Payne | | D02G 3/402 442/189 |
| 2008/0132615 A1 * | 6/2008 | Peerlings | | C08G 18/0895 524/100 |
| 2008/0296544 A1 * | 12/2008 | Wesson | | B66B 7/062 254/264 |
| 2012/0329591 A1 * | 12/2012 | Goeser | | B66B 7/062 474/238 |
| 2013/0042939 A1 * | 2/2013 | Wesson | | D03D 1/0094 139/11 |
| 2013/0167967 A1 * | 7/2013 | Wesson | | D03D 13/004 139/11 |
| 2013/0171463 A1 * | 7/2013 | Chang | | B66B 7/062 428/549 |
| 2015/0191331 A1 * | 7/2015 | Orelup | | D07B 1/22 428/76 |
| 2015/0259176 A1 * | 9/2015 | Goeser | | B66B 7/062 428/189 |
| 2016/0325966 A1 * | 11/2016 | Papas | | B66B 7/062 |
| 2017/0002199 A1 * | 1/2017 | Henze | | C08K 5/5333 |
| 2017/0043979 A1 * | 2/2017 | Kucharczyk | | B66B 7/062 |
| 2017/0101293 A1 * | 4/2017 | Eastman | | B66B 7/062 |
| 2017/0225925 A1 * | 8/2017 | Wesson | | B66B 7/062 |
| 2018/0127239 A1 * | 5/2018 | Zafiris | | B05D 1/265 |
| 2018/0215946 A1 * | 8/2018 | Zhao | | B05D 3/12 |
| 2018/0305177 A1 * | 10/2018 | Zhao | | B66B 7/062 |
| 2018/0305178 A1 * | 10/2018 | Martin | | B66B 7/062 |
| 2018/0305181 A1 * | 10/2018 | Zhao | | B66B 7/062 |
| 2018/0305182 A1 * | 10/2018 | Zhao | | F16G 5/10 |
| 2018/0305866 A1 * | 10/2018 | Zhao | | D07B 1/162 |
| 2018/0339882 A1 * | 11/2018 | Zhao | | B66B 7/064 |
| 2019/0047821 A1 * | 2/2019 | Zhao | | B66B 7/062 |
| 2019/0062114 A1 * | 2/2019 | Zhao | | B66B 7/062 |
| 2019/0062115 A1 * | 2/2019 | Zhao | | B66B 7/062 |
| 2019/0062116 A1 * | 2/2019 | Zhao | | B66B 7/062 |

FOREIGN PATENT DOCUMENTS

| | | |
|---|---|---|
| DE | 2813622 A1 | 10/1979 |
| DE | 3921887 A1 | 1/1991 |
| DE | 10027761 A1 | 12/2001 |
| EP | 0617079 B2 | 12/2004 |
| WO | 0037738 A1 | 6/2000 |

OTHER PUBLICATIONS phys.org; Texas A&M University; "Thin polymer coating used to create fire-resistant fabrics" Sep. 10, 2012, 4 Pages. Accessed Online: Aug. 16, 2017. URL: https://phys.org/news/2012-09-thin-polymer-coating-tire-resistant-fabrics.html.

* cited by examiner

- Prior Art -

SELF-EXTINGUISHING FABRIC BELT FOR ELEVATOR SYSTEM

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belt, ropes or cables for supporting the elevator car and achieving the desired movement and positioning of the elevator car.

Where a belt is used as a load bearing member, a plurality of tension members are embedded in a common jacket. The jacket retains the tension members in desired positions and provides a frictional load path. In an exemplary traction elevator system, a machine drives a traction sheave with which the belts interact to drive the elevator car along a hoistway. In other elevator systems, the tension members are interwoven with a fabric material to retain the tension members. Belts typically utilize tension members formed from steel elements, but alternatively may utilize tension members formed from synthetic fibers or other materials, such as carbon fiber composites. Providing an ability to resist or minimize any burning and smoking of elevator belt would be useful. Typically large amount of flame retardant need be compounded into the belt to achieve fire resistance. This leads a belt or jacket with decreased mechanical properties and short lifetime of the parts but not self-extinguishing.

BRIEF DESCRIPTION

A belt for suspending and/or driving an elevator car including a plurality of tension elements extending longitudinally along a length of the belt, and a plurality of yarns interlaced with the plurality of tension elements forming a composite belt structure. The plurality of yarns are formed from a self-extinguishing fluoroelastomer material.

Additionally or alternatively, in this or other embodiments the fluoroelastomer material is one of an ethylene chlorotrifluoroethylene or a polyvinylidene fluoride material.

Additionally or alternatively, in this or other embodiments the fluoroelastomer material is configured to not ignite or propagate flame in atmosphere containing up to 52% oxygen.

Additionally or alternatively, in this or other embodiments the fluoroelastomer material has an auto-ignition temperature of at least 655 degrees Celsius.

Additionally or alternatively, in this or other embodiments the fluoroelastomer material has a Shore D hardness in the range of 39-75.

Additionally or alternatively, in this or other embodiments the fluoroelastomer material has a stress at breakage of at least 32 Megapascals.

Additionally or alternatively, in this or other embodiments the fluoroelastomer material has an elongation at break of between 250% and 500%

Additionally or alternatively, in this or other embodiments a tension member of the plurality of tension members is formed from a plurality of fibers suspended in a matrix material.

Additionally or alternatively, in this or other embodiments the plurality of yarns are interlaced with the plurality of tension elements by one or more of weaving, knitting or braiding.

Additionally or alternatively, in this or other embodiments a coating layer of fluoroelastomer material is applied to the plurality of tension elements.

In another embodiment, an elevator system includes a hoistway, an elevator car positioned in the hoistway and movable therein, a belt operably connected to the elevator car to suspend and/or drive the elevator car along the hoistway. The belt includes a plurality of tension elements extending longitudinally along a length of the belt and a plurality of yarns interlaced with the plurality of tension elements forming a composite belt structure. The plurality of yarns are formed from a self-extinguishing fluoroelastomer material.

Additionally or alternatively, in this or other embodiments the fluoroelastomer material is one of an ethylene chlorotrifluoroethylene or a polyvinylidene fluoride material.

Additionally or alternatively, in this or other embodiments the fluoroelastomer material is configured to not ignite or propagate flame in atmosphere containing up to 52% oxygen.

Additionally or alternatively, in this or other embodiments the fluoroelastomer material has an auto-ignition temperature of at least 655 degrees Celsius.

Additionally or alternatively, in this or other embodiments the fluoroelastomer material has a Shore D hardness in the range of 39-75.

Additionally or alternatively, in this or other embodiments the fluoroelastomer material has a stress at breakage of at least 32 Megapascals.

Additionally or alternatively, in this or other embodiments the fluoroelastomer material has an elongation at break of between 250% and 500%

Additionally or alternatively, in this or other embodiments a tension member of the plurality of tension members is formed from a plurality of fibers suspended in a matrix material.

The elevator system of claim 11, wherein the plurality of yarns are interlaced with the plurality of tension elements by one or more of weaving, knitting or braiding.

The elevator system of claim 11, further comprising a coating layer of fluoroelastomer material applied to the plurality of tension elements.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
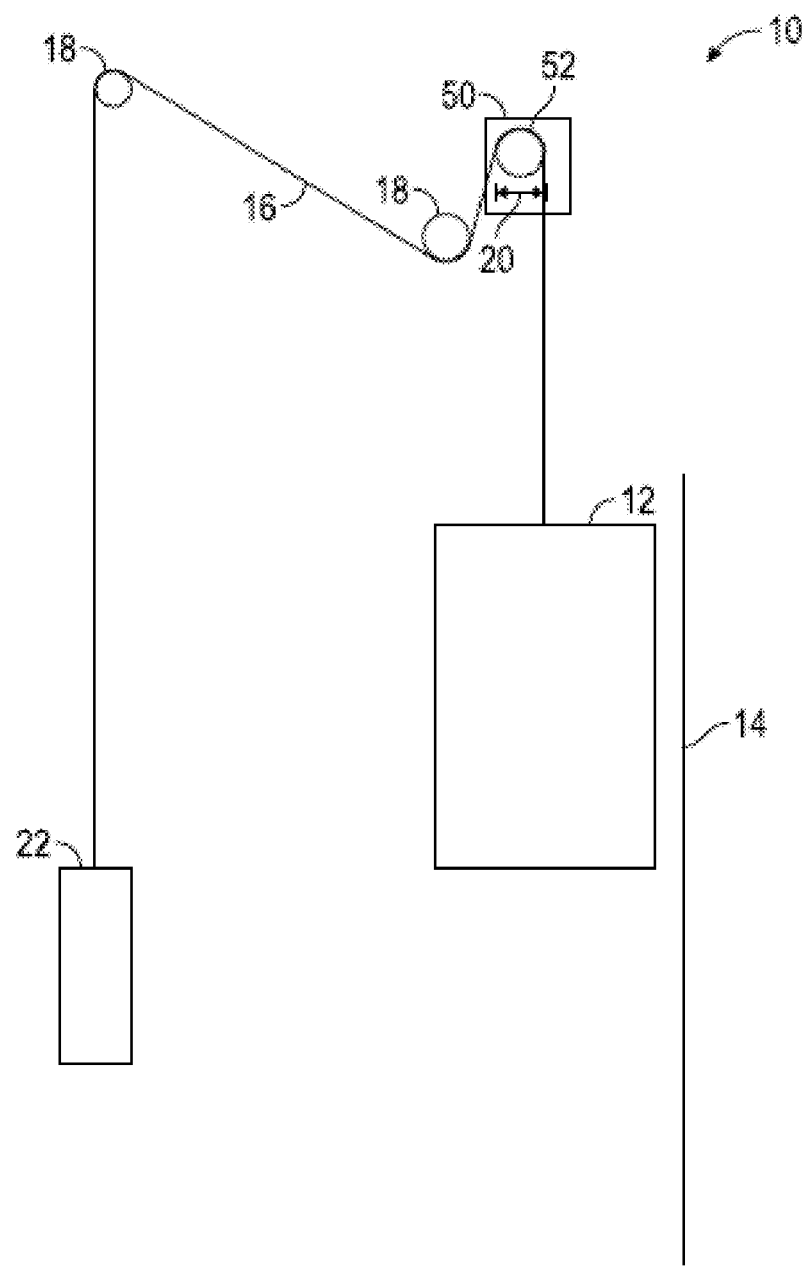
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter 20, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52. At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
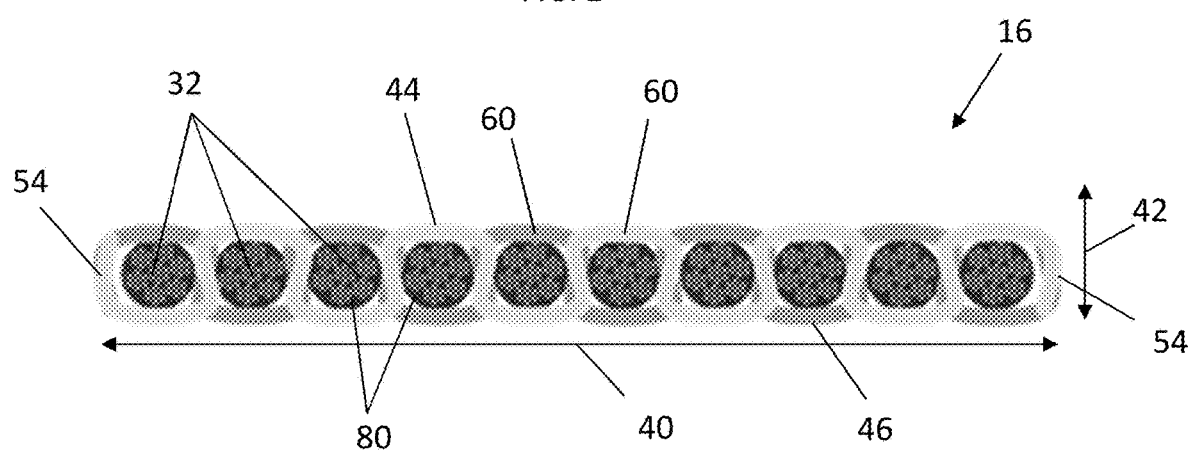
FIG. 2 is cross-sectional view of an embodiment of a belt for an elevator system.

FIG. 2 provides a cross-sectional schematic of an exemplary belt 16 construction or design. The belt 16 includes a plurality of tension elements 32 extending longitudinally along the belt 16. The belt 16 has a belt width 40 and a belt thickness 42, with an aspect ratio of belt width 40 to belt thickness 42 greater than one. The belt 16 defines a traction side 44, which is interactive with the traction sheave 52 and a back side 46 opposite the traction side 44. The belt 16 further defines belt edges 54 extending between the traction side 44 and the back side 46.

Figure 3A:
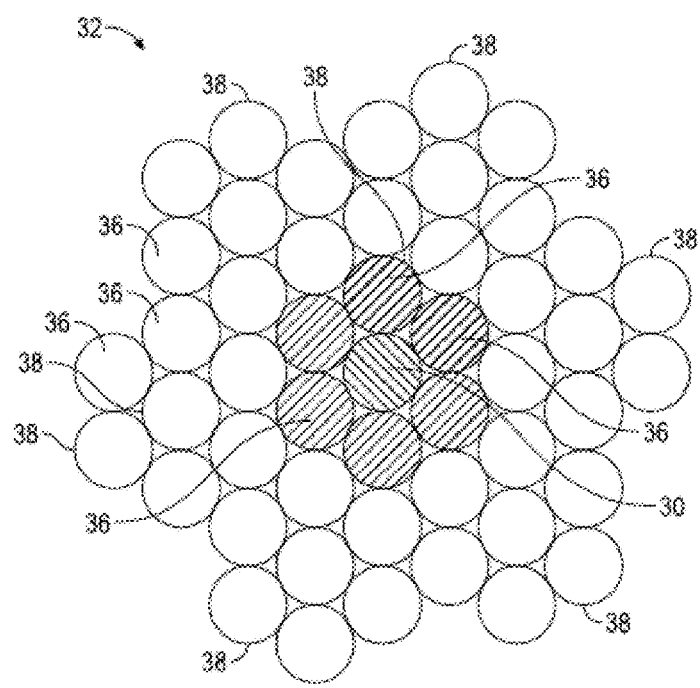
FIG. 3A is a cross-sectional view of an embodiment of a tension member for a belt for an elevator system.
Figure 3B:
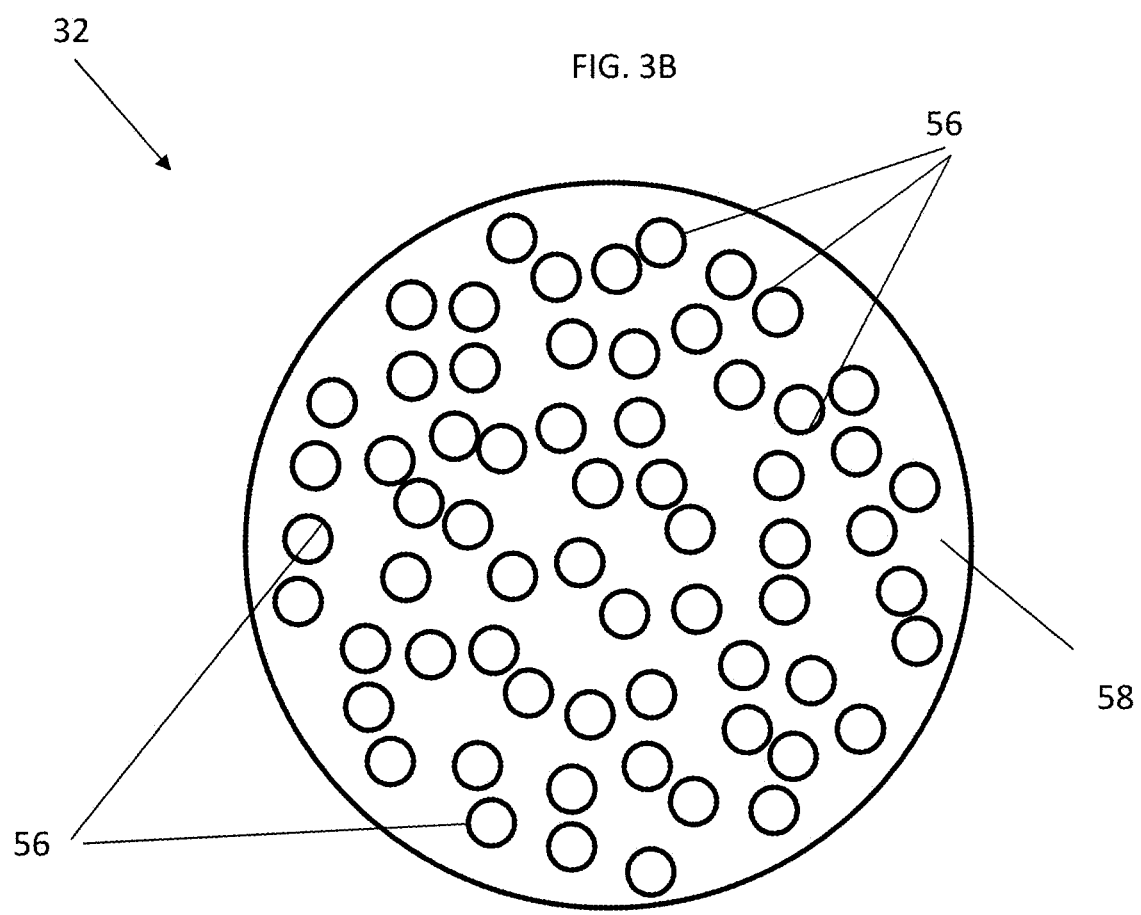
FIG. 3B is a cross-sectional view of another embodiment of a tension member for a belt for an elevator system.

As shown in FIG. 3A, in some embodiments, the tension elements 32 are cords formed from a plurality of steel wires 36, which may be arranged into strands 38. Referring again to FIG. 2, the tension elements 32 are arranged generally parallel to each other and extend in a longitudinal direction that establishes a length of the belt 16. While ten tension elements 32 are illustrated in the embodiment of FIG. 2, other embodiments may include other numbers of tension elements 32, for example, 6, 8 or 12 tension elements 32. Further, while the tension elements 32 of the embodiment of FIG. 2 are substantially identical, in other embodiments, the tension elements 32 may differ from one another in number of wires 36, materials or arrangement. In another embodiment, shown in FIG. 3B, the tension elements 32 are formed from a plurality of fibers 56, such as liquid crystal polymer, carbon fiber, glass fiber or aramid fiber, disposed in a matrix material 58. Materials such as polyurethane, vinylester, or epoxy may be utilized as the matrix material.

The tension elements 32 are woven, knitted or braided with one or more types of yarns 60 to form the belt 16. In one embodiment, shown in FIG. 2, the tension elements 32, and yarns 60 are interlaced into a woven structure. In some embodiments, the yarns 60 include weft yarns and warp yarns substantially perpendicular to the weft yarns. It is to be appreciated that other angles and other methods of interlacing the tension elements 32 with the yarns 60 may be utilized in forming the belt 16. These methods include, but are not limited to, knitting and braiding. In some embodiments, more than one of the above methods may be utilized to form the belt 16.

The yarns 60 are formed from a selective fluoroelastomer material. The selective fluoroelastomers are polyvinylidene fluoride (PVDF) and/or ethylene chlorotrifluoroethylene (ECTFE) based. Ethylene chlorotrfiluoroethylene polymer, unlike most thermoplastics, when placed in flame, it does not form flaming droplets. On removal of the flame from the material, the material immediately extinguishes. The material will not ignite or propagate flame in atmosphere containing up to 52% oxygen, and has an auto-iginition temperature of at least 655 degrees Celsius. The fluoroelastomer material further had a Shore D hardness in the range of 39-75, and a stress at breakage of at least 32 Megapascals. Further, the fluoroelastomer material has an elongation at break of between 250% and 500% compared to its unloaded length.

In addition to the yarns 60 formed from fluoroelastomer material, in some embodiments a coating layer 80 of fluoroelastomer material is applied to the tension members 32 prior to interlacing the tension members 32 with the yarns 60 to form the belt 16. This coating layer 80 of the tension members 32 further increases a self-extinguishing capability of the belt 16.

Use of the selective fluoroelastomer material as the yarns 60 of the belt 16 improves fire performance of the belt 16 and the elevator system 10, while still maintaining the desired mechanical and performance properties of the base material layer of the belt 16.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for suspending and/or driving an elevator car, comprising:
    a plurality of tension elements extending longitudinally along a length of the belt; and
    a plurality of yarns interlaced with the plurality of tension elements forming a composite belt structure, the plurality of yarns formed from a self-extinguishing fluoroelastomer material.

2. The belt of claim 1, wherein the fluoroelastomer material is one of an ethylene chlorotrifluoroethylene or a polyvinylidene fluoride material.

3. The belt of claim 1, wherein the fluoroelastomer material is configured to not ignite or propagate flame in atmosphere containing up to 52% oxygen.

4. The belt of claim 1, wherein the fluoroelastomer material has an auto-ignition temperature of at least 655 degrees Celsius.

5. The belt of claim 1, wherein the fluoroelastomer material has a Shore D hardness in the range of 39-75.

6. The belt of claim 1, wherein the fluoroelastomer material has a stress at breakage of at least 32 Megapascals.

7. The belt of claim 1, wherein the fluoroelastomer material has an elongation at break of between 250% and 500%.

8. The belt of claim 1, wherein a tension member of the plurality of tension members is formed from a plurality of fibers suspended in a matrix material.

9. The belt of claim 1, wherein the plurality of yarns are interlaced with the plurality of tension elements by one or more of weaving, knitting or braiding.

10. The belt of claim 1, further comprising a coating layer of fluoroelastomer material applied to the plurality of tension elements.

11. An elevator system, comprising:
    a hoistway;
    an elevator car disposed in the hoistway and movable therein;
    a belt operably connected to the elevator car to suspend and/or drive the elevator car along the hoistway, the belt including:
        a plurality of tension elements extending longitudinally along a length of the belt; and
        a plurality of yarns interlaced with the plurality of tension elements forming a composite belt structure, the plurality of yarns formed from a self-extinguishing fluoroelastomer material.

12. The elevator system of claim 11, wherein the fluoroelastomer material is one of an ethylene chlorotrifluoroethylene or a polyvinylidene fluoride material.

13. The elevator system of claim 11, wherein the fluoroelastomer material is configured to not ignite or propagate flame in atmosphere containing up to 52% oxygen.

14. The elevator system of claim 11, wherein the fluoroelastomer material has an auto-ignition temperature of at least 655 degrees Celsius.

15. The elevator system of claim 11, wherein the fluoroelastomer material has a Shore D hardness in the range of 39-75.

16. The elevator system of claim 11, wherein the fluoroelastomer material has a stress at breakage of at least 32 Megapascals.

17. The elevator system of claim 11, wherein the fluoroelastomer material has an elongation at break of between 250% and 500%.

18. The elevator system of claim 11, wherein a tension member of the plurality of tension members is formed from a plurality of fibers suspended in a matrix material.

19. The elevator system of claim 11, wherein the plurality of yarns are interlaced with the plurality of tension elements by one or more of weaving, knitting or braiding.

20. The elevator system of claim 11, further comprising a coating layer of fluoroelastomer material applied to the plurality of tension elements.

* * * * *